(12) United States Patent
Lambey

(10) Patent No.: US 6,812,397 B2
(45) Date of Patent: Nov. 2, 2004

(54) PHOTOCURRENT-GENERATING FABRIC AND SUPPORT FOR SUCH A FABRIC

(76) Inventor: Jacques Lambey, 6 Rue Nicolas Sicard, Lyons, F-69005 (FR)

(*) Notice: Subject to any disclaimer, the term of this patent is extended or adjusted under 35 U.S.C. 154(b) by 0 days.

(21) Appl. No.: 10/672,141

(22) Filed: Sep. 26, 2003

(65) Prior Publication Data

US 2004/0055633 A1 Mar. 25, 2004

Related U.S. Application Data

(63) Continuation of application No. PCT/FR02/01316, filed on Apr. 17, 2002.

(51) Int. Cl.⁷ .............................. E04F 10/02; E06B 9/24; E04H 4/06; H01L 31/042

(52) U.S. Cl. ..................... 136/245; 136/244; 136/291; 136/251; 160/66; 160/67; 160/127; 160/904

(58) Field of Search ............................... 136/245, 244, 136/291, 251; 160/66, 67, 127, 904

(56) References Cited

U.S. PATENT DOCUMENTS

| 4,636,579 A | * | 1/1987 | Hanak et al. | ............... 136/245 |
| 5,433,259 A | * | 7/1995 | Faludy | ........................ 160/67 |

FOREIGN PATENT DOCUMENTS

| DE | 3501222 A1 | * | 7/1986 |
| DE | 3909937 A1 | * | 10/1990 |
| DE | 20000681 U1 | * | 3/2000 |
| EP | 916781 A1 | * | 5/1999 |
| JP | 2001-123620 A | * | 5/2001 |
| WO | WO 99/61721 A2 | * | 12/1999 |

* cited by examiner

Primary Examiner—Alan Diamond
(74) Attorney, Agent, or Firm—Heslin Rothenberg Farley & Mesiti P.C.

(57) ABSTRACT

A device intended to be used as a shade, awning, blind and swimming pool cover includes a photocurrent-generating fabric and a support for winding and storing the fabric. The support is formed by an axisymetric tube of regular polygonal cross-section around the periphery of which the fabric is wound. The photo current-generating fabric includes a layer of interconnected photovoltaic cells.

11 Claims, 4 Drawing Sheets

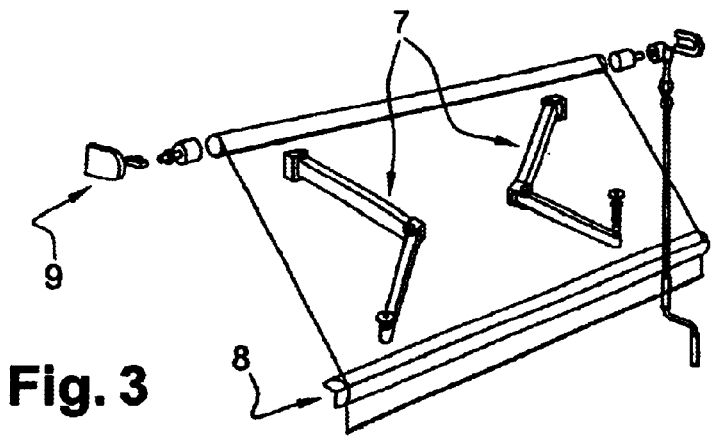
Fig. 3
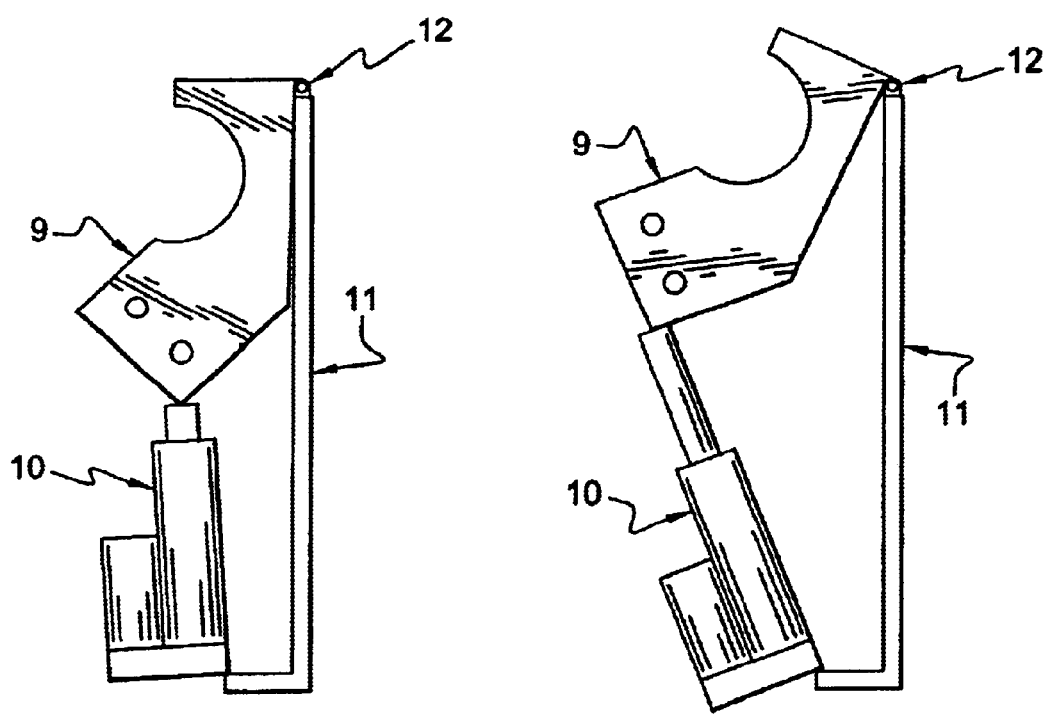
Fig. 4a  Fig. 4b

PHOTOCURRENT-GENERATING FABRIC AND SUPPORT FOR SUCH A FABRIC

CROSS-REFERENCE TO RELATED APPLICATIONS

This application is a continuation of International Application No. PCT/FR02/01316 filed Apr. 17, 2002 and published as WO 02/084044, in French, on Oct. 24, 2002, and claims priority of Application No. 01.05176 filed Apr. 17, 2001 in France.

The invention relates to the construction of photocurrent-generating fabrics and coverings, that is to say fabrics that are capable of generating an electric current resulting from sunlight. It also relates to the equipment needed to combine the usual solar protection inherent in the use of shades with the delivery of electricity from the photovoltaic cells.

The photocurrent-generating fabric according to the invention is intended to be used as an outdoor shade, either fixed or windable, for shop windows, glazed bays, terraces, verandas, balconies and loggias, and also as awnings for caravans, camper cars, mobile homes and bungalows, and also as pond and swimming pool covers.

The use of fabric as a shade or equivalent device for providing protection from solar radiation is widely known and well developed, so that there is no need to describe it here in detail. The object of the invention is to profit from the exposure of these fabrics to said solar radiation in order to produce electricity, by incorporating into it a layer of interconnected photovoltaic cells.

There are various difficulties that arise when doing such incorporation, which include effective physical protection of said cells, their interconnection, but also the problem relating to storing the fabric provided with such a layer, insofar as there is a risk of the cells being damaged by being stored.

According to the invention, the photocurrent-generating covering is composed of an array of interconnected solar cells placed in layers. These cells are produced from thin films (the thickness of which is greater than 10 microns) of amorphous silicon, single-crystal or polycrystalline silicon, cadmium telluride, copper indium diselenide or gallium arsenide. They are placed on a rigid substrate, such as glass, ceramic or steel, or on a flexible substrate, such as organic materials or polymers. This multilayer stack includes a molybdenum electrode for the lower electrical contact and a transparent zinc oxide electrode constitutes the upper electrical contact.

This layer of cells is encapsulated in a thermoplastic resin or is covered with a film. This protective film is intended to protect the cells from moisture, to make them resistant to ultraviolet and also to provide electrical insulation.

A multilayer plastic sheet covers the rear side of the layer and protects it from mechanical wear due to it being wound onto a storage support.

The invention therefore also relates to a support for a photocurrent-generating fabric, consisting of an axisymetric tube of uniform polygonal cross section around the periphery of which said fabric is wound. The photovoltaic cells are thus distributed over the fabric in a succession of rows, the spacing between two adjacent rows being chosen in such a way that, when said fabric is stored on the polygonal tube, the cells are kept in a plane parallel to one of the sides that define said polygon. Furthermore, the length of the sides of the polygon making up the tube is greater than the largest dimension of the photovoltaic cells.

The manner in which the invention may be realized, and the advantages that stem therefrom, will become clearly apparent from the following illustrative examples given by way of indication, but implying no limitation, and supported by the appended figures.

FIG. 3 illustrates schematically the mechanism for winding said shade.

FIGS. 4a and 4b illustrate schematically the mechanism for inclining the shade, in the standard position and in an inclined position respectively.

Figure 1:
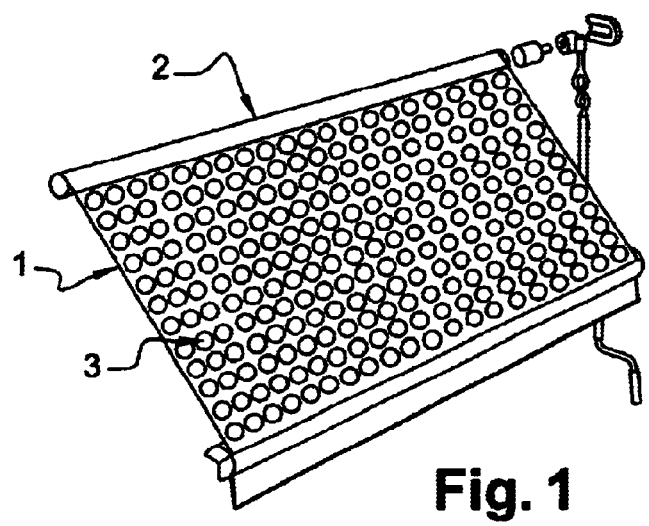
FIG. 1 is a schematic perspective view of a photocurrent-generating shade employing the fabric according to the invention.
Figure 2:
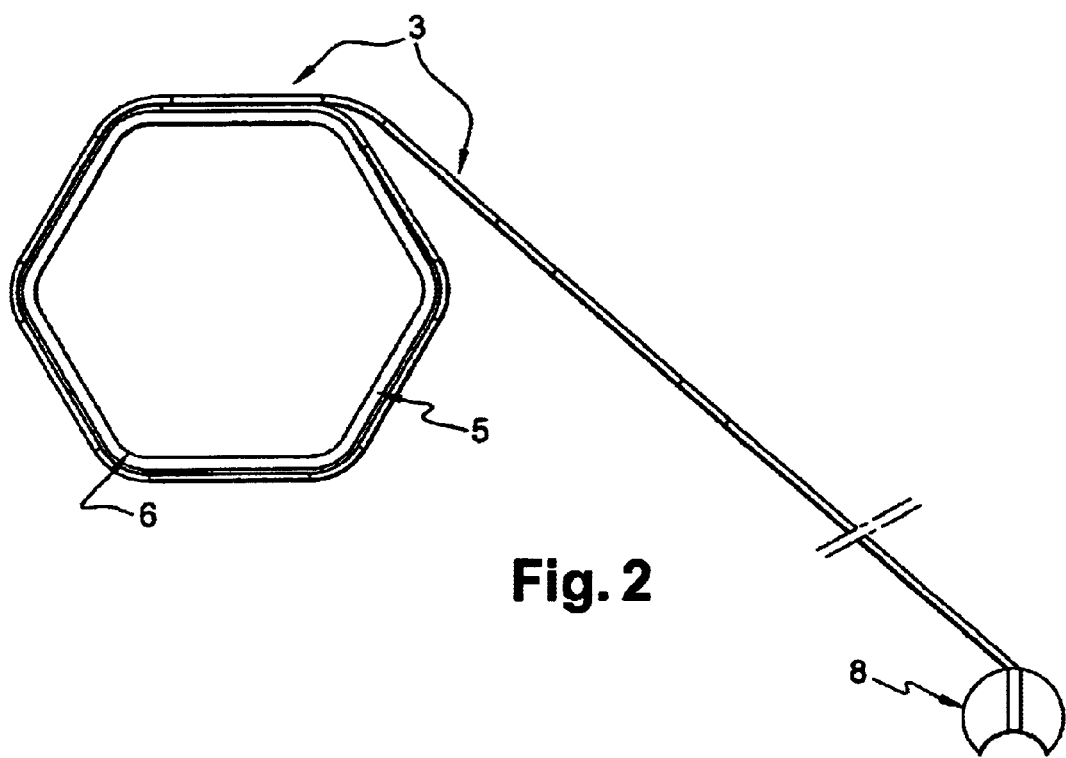
FIG. 2 is a schematic cross-sectional view illustrating the particular storage method according to the invention.
Figure 5:
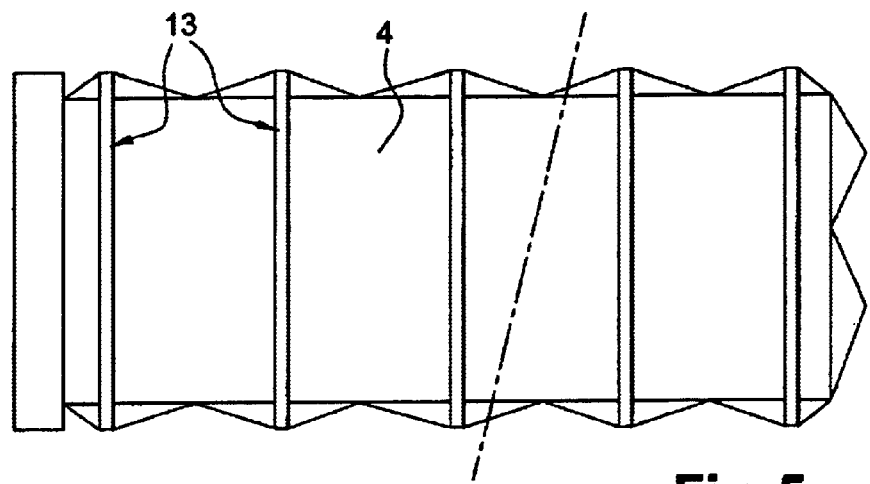
FIG. 5 is a schematic plan view of a swimming pool cover employing a photocurrent-generating fabric according to the invention, a detailed view of which is given in FIG. 6.
Figure 6:
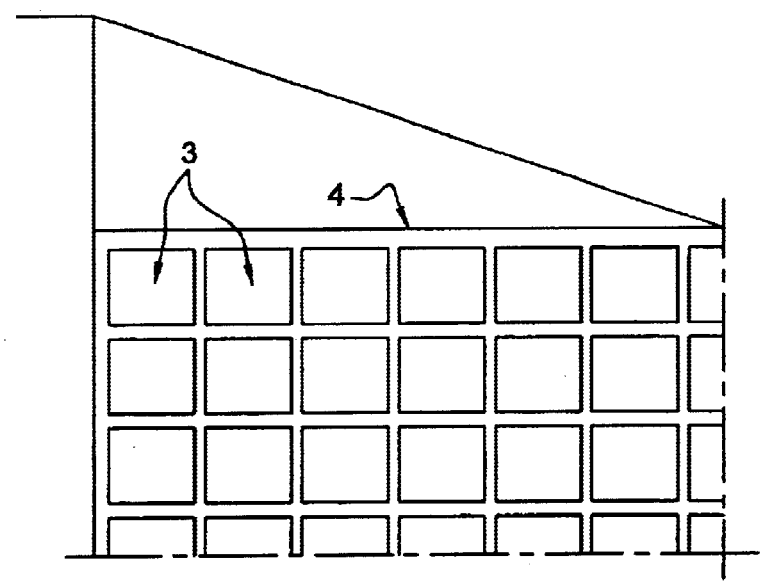
FIG. 6 illustrates a detailed view of the photocurrent-generating fabric in FIG. 5.

FIGS. 1 to 5 therefore show an embodiment of the photocurrent-generating fabric according to the invention in relation to a shade (2). The latter therefore incorporates a photocurrent-generating fabric (1) comprising a succession of rows of interconnected photovoltaic cells (3). That side of the shade intended to be exposed to the solar radiation is coated with a thermoplastic resin, intended to protect the cells from moisture, to make them resistant to ultraviolet and also to provide electrical insulation.

As a corollary, the opposite side receives a multiplayer plastic sheet intended to protect the fabric (1) from mechanical wear due to it being wound onto a storage support.

The photocurrent-generating fabric (1) when exposed to sunlight produces a DC electric voltage of 6, 12 or 24 volts, that can supply local electrical appliances or can be sent to the electrical distribution grid, after having been transformed into AC and metered. The efficiency of the photovoltaic cells varies according to the exposure time and to the angle of irradiation, sunlight perpendicular to the photovoltaic cells (3) being the most effective.

This fabric is stored on a special support, in accordance with the present invention.

Thus, for simple shades, the travel of which is accomplished by the manual or motor-driven rotation of winding cylinder for the fabric, and the tensioning of the fabric of which is due to the weight of the loading bar (8), the cylinder for winding the support is formed by a tube (5), the cross section of which is in the form of a regular polygon, and in the example described in the form of a hexagon. Of course, any other shape could be adopted, especially an equilateral triangle, a square, a pentagon, etc.

Whatever the regular polygon used for the tube (5), the width of each face must be at least equal to the width of the photovoltaic cell (3). Furthermore, said cells (3) are distributed over the fabric (1) in regular rows, the spacing between two adjacent rows being chosen in such a way as to leave an intermediate space devoid of any cells, so as to cover the angle that separates the constituent plane surfaces of the sides that define the tube (5), the edges (6) of the constituent polygon of said tube (5) being advantageously rounded so as to make the winding and unwinding of the fabric more progressive.

Thus, when the photocurrent-generating fabric is being wound onto the tube (5), the photovoltaic cells (3) are laid in succession on each plane face of the regular polygon and thus stack up, revolution after revolution, on top of one another without any risk of fracture or premature wear by bending.

In the case of complex shades fitted with extension arms (7), with a loading bar (8), with a winding system and with supports (9) for the fabric, the cylindrical winding tube is replaced with a tube in the form of a regular polygon, as was described above. It is also recommended to equip the lateral supports for the polygonal tube and for the extension arms with a variable inclination system so as to increase the efficiency of the photocurrent-generating fabric. For this purpose, two small-sized electrically operated cylinders (10), fastened to a plate (11) that is fixed to the wall or to the partition that supports the shade, act together on the supports (9), these being fitted with hinges (12), so as to raise or lower the supports (9), and consequently the shade, over the course of the day. These cylinders are advantageously controlled by a clock and automatically position the photocurrent-generating fabric according to the daily and seasonal path of the sun. In France, this path at zenith is at 23° in winter and at 60° in summer. Thus, this system ensures optimum efficiency.

In the case of photocurrent-generating shades equipped with an automatic inclination system in which the opening and closing operations are motor-driven, it is possible to program these operations from 9 h to 16 h, this time range allowing 90% of the daily solar energy to be received.

The photocurrent-generating shades, awnings and blinds according to the invention have several advantages, among which the following may be mentioned:
- the use of conventional shade mechanisms, making it possible to incorporate at lower cost the photocurrent-generating fabrics in new buildings and existing buildings;
- electrical energy production efficiencies greater than those obtained with fixed modules installed in roofs, walls or on the ground; and
- the possibility of providing two functions, namely solar protection and photogeneration of electrical energy.

Furthermore, depending on the envisioned applications, the following points may also be mentioned:
- awnings for camper cars, caravans, mobile homes and bungalows provide energy independence and ensure the recharging of batteries;
- photocurrent-generating blinds installed on the facade of boutiques supply the shop windows with lighting and illuminated information 24 h a day without additional cost.

The photocurrent-generating fabric according to the invention can also be used for pond or swimming pool covers (4).

The orientation of the swimming pools and ponds relative to the path of the sun requires the use of two types of photocurrent-generating covers: covers for East-West exposure and covers for North-South exposure.

East-West covers have a photocurrent-generating fabric in which the rows of cells follow in succession over the entire surface of the cover—they are intended to be installed flat over the pool. They are equipped with a succession of transverse holding bars (13) that bear on either side of the pool. The holding bars pass into a sheath located on the underside of the cover, that is to say the side facing the pool, and give the assembly rigidity.

In the middle of that region of the fabric bounded by two successive bars (13), there is a water outflow line passing across the cover and allowing rainwater to be removed. A peripheral cord tensions the cover and fixes it to the ground.

Figure 7:
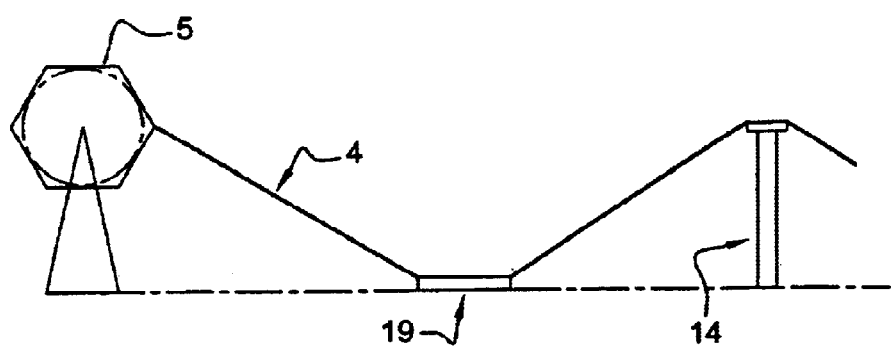
FIG. 7 illustrates the method of storing such a cover.

North-South covers (FIG. 7) have a photocurrent-generating fabric in which the regions having the rows of photovoltaic cells are separated by a smaller area containing no such cells. At each junction of the regions containing no cells, a transverse holding bar (19) rests in succession on the ground and on two feet (14) of variable height. This configuration makes it possible to raise the cover (4) a few centimeters off the ground and then to hold it on the ground, and so on, this way creating a succession of surface flats. The formation of surface flats allows the surfaces covered with photovoltaic cells to be exposed to the sunlight at an optimum irradiation angle. A constant angle of 30° in summer gives exposure perpendicular to the sunlight and therefore an efficiency of 100%. A flow line located along the bars fixed to the ground allows rainwater to be removed and a peripheral cord tensions the cover and fixes it to the ground, the holding bars passing into a sheath located on the underside of the cover and giving the assembly rigidity.

Whatever the type of cover, the generating function may be twinned with an insulating function, so as to retain overnight the heat accumulated by the water in the pool during the days exposed to sunshine.

The operation of winding the photocurrent-generating covers according to the invention involves a tube having a cross section in the form of a regular polygon, for example in the form of an equilateral triangle, a square, a pentagon or a hexagon. Whatever the regular polygon used, the width of each side must be at least equal to the width of the photovoltaic cells used within the fabric. Thus, when winding the photocurrent-generating fabric on said tube, the cells are laid in succession on each face of the regular polygon and thus stack up, revolution after revolution, on top of one another without any risk of fracture or premature wear by bending. The rows of photovoltaic cells are placed on the fabric so as to leave a bare intermediate space so as to cover the angle that separates the plane surfaces of the tube, as described in relation to FIG. 2. The holding bars (13, 19) are progressively removed as the photocurrent-generating fabric is being wound up. This winding operation may be manual or motor-driven and the complete winding system may be moved or may be lowered and incorporated into the paving.

The covers for swimming pools and ponds according to the present invention have several advantages, among which the following may be mentioned:
- the availability of a large area of photovoltaic cells that can be used throughout the year and allow a large part of the energy requirements of a dwelling to be met. Depending on the regional sunshine, they produce between 110 and 140 kWh/year/m$^2$ without either discharging any greenhouse gases or producing any waste;
- the usual functionality of swimming pool covers is preserved;
- the usual winding mechanisms are preserved; and
- the possibility of incorporating renewable energies for lower cost in new or existing habitats.

The electrical connection between the photocurrent-generating fabric (1) and the electrical circuit of the building to which it can be connected is achieved in the following manner. This connection is established by means of a rotary system composed of disks or cylinders.

Figure 8:
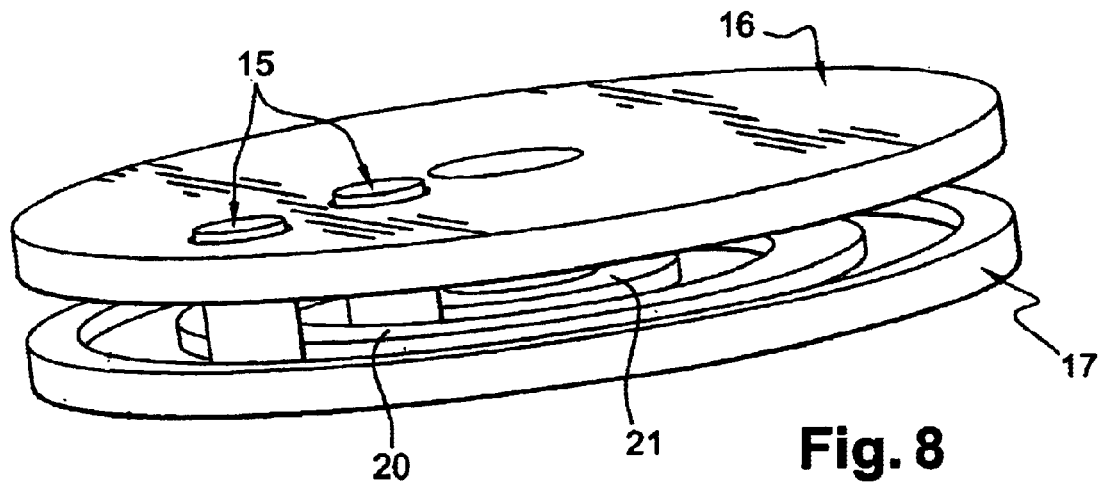
FIG. 8 illustrates a first embodiment of the electrical connection between the photocurrent-generating fabric and the electrical circuit of the entity to which it is connected.

Thus, in a first embodiment, illustrated in FIG. 8, the rotary system incorporates two disks (16, 17). The first, electrically insulating disk (17) is fastened to the tube (5) and is therefore capable of rotating concomitantly with the latter. It comprises two electrically conducting concentric circular blades (20, 21) fitted into two grooves provided for this purpose on the disk and connected to the two respective electrodes emerging from the set of photovoltaic cells.

The second disk (16) is fastened to the support for said tube and is mounted coaxially with the tube (5) and with the first disk (17). It is therefore static. This disk (16) is equipped with two electrical contactors (15) protecting toward the disk (17) so as to be permanently in contact with the two circular blades (20, 21). These contactors are connected to the two electrical supply wires of the building's electrical circuit.

Thus, when the fabric is being wound onto or unwound from the tube (5), the disk (17) fastened to the tube (5) rotates in a corollary manner about the same axis as the static disk (16) fastened to the support, the electrical contact never being broken, since there is permanent contact between the contactors (15) and the circular blades (20, 21).

Figure 9:
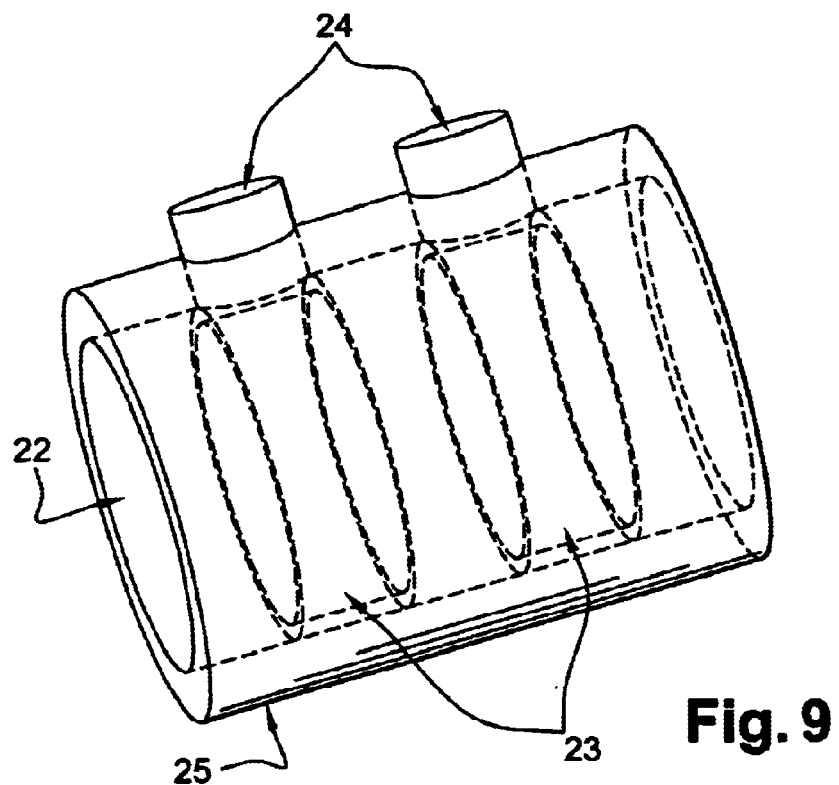
FIG. 9 illustrates a second embodiment of the electrical connection between the photocurrent-generating fabric and the electrical circuit of the entity to which it is connected.

In the second embodiment shown in relation to FIG. 9, the rotary system incorporates a cylindrical peripheral ring (25) that is fastened to the support of the tube (5) and is electrically insulating. This ring (25) is therefore static. It incorporates two electrical contactors (24) that extend on either side of the wall defining said ring and are connected to the two electrical supply wires of the building's electrical circuit.

This system also includes a cylinder (22), coaxial with the ring (25) and fastened to the tube (5). This insulating cylinder (22) is likewise mounted coaxially with the axis of rotation of said tube (5). This cylinder is capable of rotating inside the ring (25). It is provided with two likewise cylindrical electrically conducting blades (23) connected to the two respective electrodes emerging from the set of photovoltaic cells. The axis of revolution of two blades is coincident with the axis of revolution of the cylinder (22). The blades are intended to be in permanent contact with the contactors (24) of the ring (25).

Thus, while the fabric is being wound onto or unwound from the tube (5), the cylinder (22) fastened to the tube (5) rotates in a corollary manner about the same axis as the static ring (25) fastened to the support, the electrical contact never being broken since there is permanent contact between the contactors (24) and the cylindrical blades (23).

The mean annual solar efficiency according to the orientation and the static inclination relative to the horizontal of the photocurrent-generating fabrics is the following:

| Inclined at 30° and exposed: | |
|---|---|
| to the East | 90% |
| to the South-East and to the South-West | 96% |
| to the South | 100% |
| to the West | 93%; |
| Inclined at 60° and exposed: | |
| to the East | 78% |
| to the South-East and to the South-West | 88% |
| to the South | 91% |
| to the West | 93%; |
| When vertical and exposed: | |
| to the East | 55% |
| to the South-East and to the South-West | 66% |
| to the South | 68% |
| to the West | 55%; |
| When flat: 93%. | |

For shades and awnings equipped with the automatic inclination system, the mean annual solar efficiency is 100% whatever the exposure, namely East, West, South-East, South-West or South.

What is claimed is:

1. A device intended to be used as a shade, awning, blind and swimming pool or pond cover, comprising a photocurrent-generating fabric and a support for winding and storing said fabric, wherein the support is formed by an axisymetric tube of regular polygonal cross section, the fabric is wound around a periphery of the tube and the photocurrent-generating fabric comprises a layer of interconnected photovoltaic cells, said photovoltaic cells being distributed over the fabric in a succession of rows, spacing between two adjacent rows being chosen in such a way that storage of said fabric on the tube of polygonal cross section allows the cells to be kept in a plane parallel to one of sides of a polygon formed by said regular polygonal cross section.

2. The device as claimed in claim 1, wherein the layer of cells is encapsulated in a thermoplastic resin.

3. The device as claimed in claim 1, wherein the layer of cells is covered with a thermoplastic film.

4. The device as claimed in claim 1, wherein a multilayer plastic sheet covers a rear side of the fabric.

5. The device as claimed in claim 1, more particularly intended to be used as a pond or swimming pool cover, wherein the fabric is provided with transverse bars that rest in succession on the ground and on two feet positioned on either side of a pond or swimming pool, so as to form a series of flats exposed to sunlight.

6. The device as claimed in claim 5, wherein said feet are of variable height.

7. The device as claimed in claim 1, wherein a length of said one of sides of the polygon is greater than a largest dimension of the cells and wherein edges of the polygonal cross section tube are rounded so that winding and unwinding of the fabric are gradual.

8. The device as claimed in claim 1, wherein the tube is provided with lateral supports and is also joined to extension arms suitable for tensioning the fabric, said extension arms being capable of pivoting owing to action of at least one electrically operated cylinder, in such a way that the fabric remains perpendicular to sunlight over a daily path of the sun.

9. The device as claimed in claim 1, wherein the support includes a rotary electrical connection member that can transfer electricity generated by said fabric to an external entity.

10. The device as claimed in claim 9, wherein the rotary electrical connection member incorporates:

a first, electrically insulating disk fastened to the tube and comprising two electrically conducting concentric circular blades connected to two respective electrodes emerging from the layer of photovoltaic cells; and a second, static disk fastened to a mounting support of the tube and mounted coaxially with the tube and with the first disk, said second disk being equipped with two electrical contactors that project toward the first disk so as to be permanently in contact with the two circular blades, said contactors being connected to the electrical supply wires of an electrical circuit of an external entity.

11. The device as claimed in claim 9, wherein the rotary electrical connection member incorporates:

a static cylindrical peripheral ring which is fastened to a mounting support of the tube and is electrically insulated, said ring incorporating two electrical contactors that extend on either side of a wall defining said ring and are connected to two electrical supply wires of an electrical circuit of an external entity; and an insulating cylinder, coaxial with respect to the ring and fastened to the tube, said cylinder being mounted coaxially with respect to an axis of rotation of said tube and being capable of rotating inside the ring, said cylinder being provided with two cylindrical electrically conducting blades connected to two respective electrodes emerging from the layer of photovoltaic cells, an axis of revolution of the two blades being coincident with an axis of revolution of the cylinder, said blades being in permanent contact with the contractors of the ring.

* * * * *